United States Patent Office 3,500,806
Patented Mar. 17, 1970

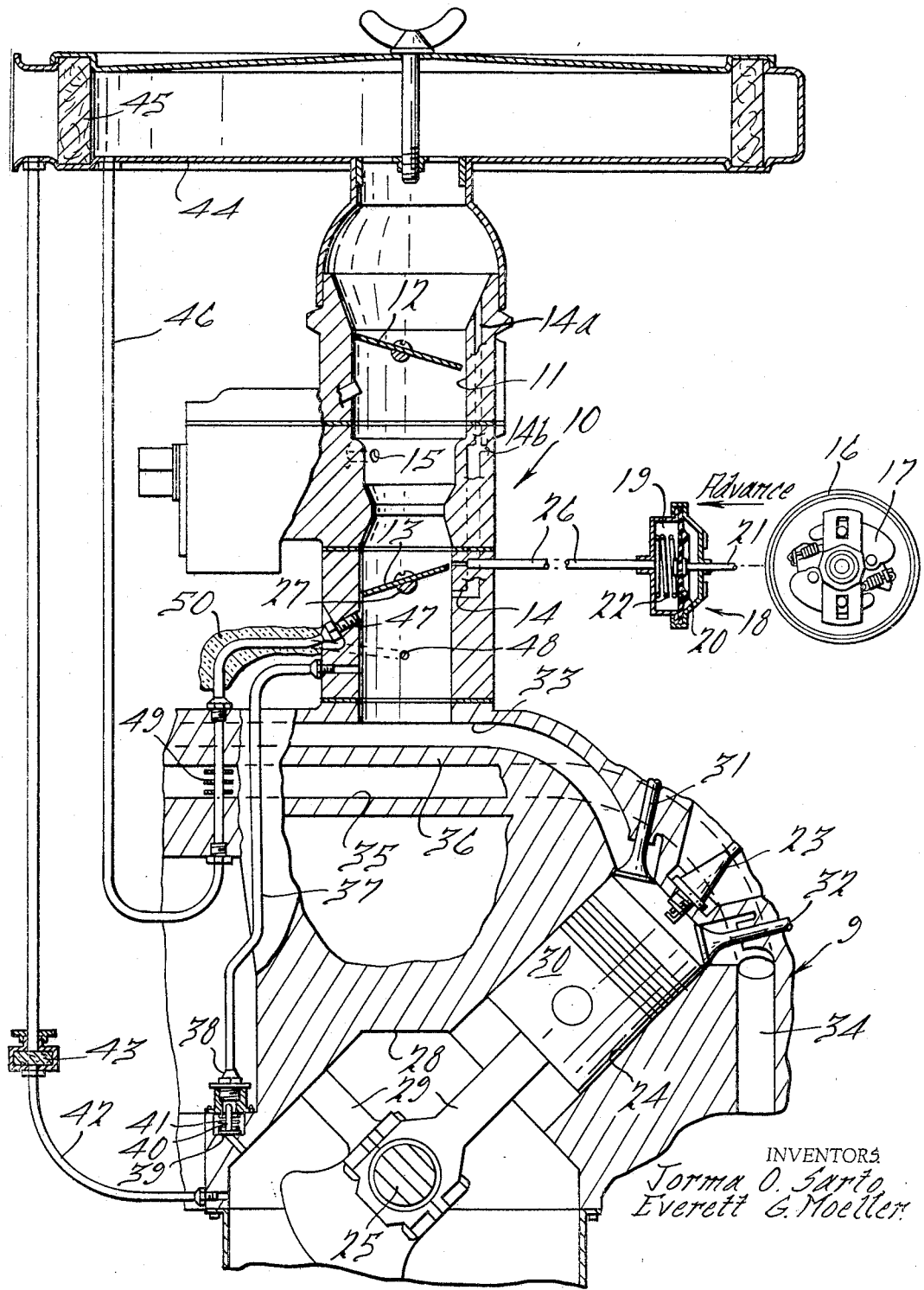

3,500,806
PREHEATING INLET AIR DURING
ENGINE IDLING
Jorma O. Sarto, Orchard Lake, and Everett G. Moeller, Grosse Pointe Farms, Mich., assignors to Chrysler Corporation, Highland Park, Mich., a corporation of Delaware
Filed Apr. 12, 1968, Ser. No. 720,859
Int. Cl. F02m 23/14; F02d 37/02; F02f 9/02
U.S. Cl. 123—119                                      8 Claims

ABSTRACT OF THE DISCLOSURE

An internal combustion engine which may employ closed crankcase ventilation and which has an acceptable idle operating condition at optimum fuel economy is idled at retarded ignition and with idle fuel supplied in a stoichiometric mixture at an accelerated rate with respect to said condition of optimum economy. The idle combustion supporting air required for the accelerated idle fuel supply in addition to the minimum non-preheatable air necessary for the crankcase ventilation and the customary bypass air flow around the throttle is conducted in heat exchange relationship with the hot exhaust gases of the engine and induced into the carburetor induction conduit downstream of the throttle valve to heat the latter and enhance vaporization and dispersion of the idle fuel prior to combustion.

Background and summary of the invention

This invention relates to an improved means and method for operating an automobile engine at the idle condition, so as to improve the admixture of fuel and preheated air prior to combustion and thereby to improve combustion and minimize the emission of unburned hydrocarbons in the exhaust during normal warm idling and also to shorten the time required for idle fuel enrichment during engine warm-up. Heretofore in order to prevent engine stalling during cold engine idling, it has been customary to supply an enriched fuel-air mixture which resulted in the exhausting of excessive amounts of unburned hydrocarbons into the atmosphere. Various attempts have been made to add preheated air to the combustible mixture in order to achieve improved combustion and to reduce the requirement for fuel enrichment. However in the absence of costly regulating devices which rendered such attempts prohibitive, it has not been possible heretofore to add adequate preheated air during cold idling without supplying an excessive quantity of preheated air during normal warm operation.

Some of the difficulties involved in the preheating of the inlet air arises from the common practice of recycling crankcase vapors through the fuel-air inlet induction system and into the engine for combustion of the piston blow-by products. This practice known as closed crankcase ventilation reduces the emission of undesirable hydrocarbons into the atmosphere, but increases the problem of preheating cold inlet air during idling because the recycled crankcase vapors, which amount to approximately 25% to 35% by weight of the inlet gases cannot feasibly be preheated because such gases leave a residue that clogs the heat exchanger. Inasmuch as approximately another 60% by weight of the inlet air is necessarily cold air supplied by controlled bypass flow, comprising in part leakage around the throttle valve in the "closed" or idle position, less than 20% at most and often approximately only 5% by weight of additional air could be preheated heretofore during idle operation without recourse to complex and costly valving and control means as aforesaid.

An object of the present invention is to provide an improved and simplified carbureting and air inlet preheating means particularly useful in combination with closed crankcase ventilating and recirculating means, although not confined to such use, which facilitates preheating of the inlet combustion supporting air and throttle valve during idling and thereby reduces throttle icing, enables use of a leaner combustible fuel-air mixture and the preheating of between approximately 25% and 50% of the total inlet air during both cold and warm engine idling, materially reduces the time required for idle fuel enrichment during cold ambient conditions, achieves superior combustion and exhaust emission characteristics during normal warm idling, and materially reduces the preheated inlet air during open throttle operating conditions so as to prevent overheating of the inlet fuel-air mixture during normal driving.

Another object is to provide an improved method of idling a piston type engine having closed crankcase ventilation means for recirculating the piston blow-by products into the inlet fuel-air mixture, wherein the engine is idled at retarded ignition, a lean idle fuel-air mixture is supplied to the engine, and between approximately 25% to 50% of the inlet air is preheated prior to being admixed with fuel. By virtue of idling the engine at retarded ignition, as for example at about 5° to 15° of crankshaft rotation after top dead center for a piston type engine, an appreciably leaner fuel-air ratio approximating a stoichiometric mixture can be feasibly employed without stalling the engine provided that the total idle fuel is increased sufficiently to maintain the power required for the idle operation at the retarded ignition. The increased amount of idle fuel at the approximately stoichiometric fuel to air ratio, amounting to approximately 20% or 25% more fuel than required during conventional idling, necessitates a greater total air flow.

Thus for example, an engine that would customarily idle at a fuel to air ratio by weight of .087 and an air consumption of 35 pounds per hour can be operated to effect almost complete fuel combustion at a fuel to air ratio by weight of .070 and an air consumption of 54 pounds per hour, amounting to more than a 50% increase in air flow (i.e. approximately 54% in the example given) merely by retarding the spark or ignition to fire at 5° of crankcase rotation after the top or dead center position, rather than at the customary 10° in advance of the top center position. In such a case, the fuel consumption would increase from 3.05 to 3.78 pounds per hour, or approximately 25% (i.e. approximately 24% in example given). The present invention takes advantage of the resultant greater total air flow and preheats up to approximately 50% of the total inlet air. The remaining unheated inlet air required for crankcase ventilation and the bypass flow around the throttle valve will remain the same in accordance with the present invention as has been required heretofore for acceptable idle operation at optimum fuel economy. Accordingly, where the bypass flow amounted to approximately 60% of the total inlet air and the crankcase ventilating air amounted to between approximately 25% and 35% of the total inlet air heretofore, the 54% increase in the combustion supporting inlet air achieved in accordance with the present invention enables the preheating of inlet air amounting to between approximately 115% and 98% by weight of the unheated bypass flow. Also the proportion of air required for crankcase ventilation is also reduced correspondingly from the approximate 25% to 35% required heretofore to approximately 15% to 25% by weight of the total combustion supporting inlet air.

By virtue of preheating a larger proportion of the inlet air, improved admixing and combustion results, the engine idles more smoothly at a leaner fuel-air ratio than has been possible heretofore, and the duration of the cold idle period which requires idle fuel enrichment is materially reduced, whereby the emission of unburned hydrocarbons and carbon monoxide is further reduced.

Another and more specific object is to preheat the inlet air by passing up to approximately 50% thereof as aforesaid in heat exchange relationship with the hot exhaust gases and then into the fuel-air induction conduit at a location adjacent and downstream of the throttle, so as to heat the throttle and prevent throttle icing during idling and also to effect a more thorough admixing of the combustible fuel-air mixture and a more complete vaporization of the fuel prior to its discharge into the engine.

In accordance with the foregoing, during operation of the engine at idle or light load when the throttle is approximately closed or in the idle position, the low pressure downstream of the throttle will induce a maximum flow of preheated air into the inlet system. When the throttle is open to operate the engine at load or cruise conditions, the resulting increased pressure downstream of the throttle will induce a smaller proportion of preheated air into the inlet system, thereby to prevent overheating of the inlet fuel-air mixture during open throttle operation of the engine.

Although the piston type engine is the most common automobile engine, similar fuel, air, and ignition requirements exist for other internal combustion engines, as for example rotary combustion engines including engines of the Wankel type which operate through a compression cycle wherein the fuel and air mixture is compressed in the combustion chamber as a power take-off driven shaft is rotated through a position corresponding to minimum combustion chamber volume, and an expansion cycle wherein the energy of the combustion products is employed to rotate the driven shaft. In such engines, the blow-by of unburned hydrocarbons and carbon monoxide into the exhaust is even more pronounced during idling at optimum fuel economy than it is with the piston type engine, so that the advantages of idling with an accelerated idle fuel supply in a stoichiometric fuel-air mixture at retarded ignition as aforesaid and preheating a portion of the inlet air amounting at least approximately to the idle bypass air flow in accordance with the present invention also apply to rotary engines characterized by the compression and expansion cycles.

Also in such engines the quantity of inlet air bypass flow comprising the leakage flow around the throttle valve and the usual air supplied by the idle air bleed to disperse the idle fuel will be comparable to that required for the piston type engine, but crankcase ventilation is not usually feasible. Thus the proportion of preheated air will be even greater than the bypass inlet flow. Likewise the driven shaft and its position at the minimum combustion chamber volume are comparable to the piston engine crankshaft and top center position respectively, so that comparable accelerated fuel requirements and ignition timing conditions prevail with both types of engines when idling with the stoichiometric mixture.

Other objects are accordingly to provide an improved means and method for operating an internal combustion engine of the expansion-compression cycle type and which is particularly suitable for automotive use.

Other objects of this invention will appear in the following description and appended claims, reference being had to the accompanying drawing forming a part of this specification wherein like reference characters designate corresponding parts in the several views.

The drawing is a schematic fragmentary sectional view showing an engine and carburetor embodying the present invention.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Description of a preferred embodiment

Referring to the drawing, a particular application of the invention is illustrated by way of example with a V-8 type engine 9 and carburetor 10 having a typical air inlet induction manifold or conduit 11, choke valve 12 and throttle valve 13. This structure may be conventional and will also embody the necessary idle fuel duct 14 and primary fuel duct 15 for admitting fuel to the induction conduit 11 during engine idle and load conditions. Reference is made to T. M. Ball Patent No. 2,966,344, as if the same were incorporated herein, for a more complete description of conventional details of a carburetor fuel and air supply system suitable for use with the present invention.

Associated with the engine 9 is a conventional spark distributor 16 operably connected with a distributor advancing and retarding mechanism which includes the customary fly weight type speed responsive governor mechanism 17 for advancing the ignition with increasing speed. A pressure responsive ignition control device 18 comprises a pressure chamber 19 defined in part by a movable wall or flexible diaphragm 20. The latter is connected with a reciprocable plunger 21 which in turn is operably connected with the distributor 16 to advance or retard the timing of the engine ignition in cooperation with the governor mechanism 17 in accordance with leftward or rightward movement respectively of diaphragm 20 and plunger 21.

For example, it has been customary during engine idling heretofore to advance the distributor to fire when the engine piston is approximately 10° of crankshaft rotation in advance of its top center position, i.e., the position of minimum combustion chamber volume, and thereafter to advance the distributor progressively with increasing throttle opening and engine speed. Operation under such conditions results in optimum fuel economy but requires a fuel-air ratio during engine idling appreciably greater than the aforesaid stoichiometric ratio which supplies the minimum air required for complete combustion of the fuel.

In accordance with the present invention, a biasing spring 22 normally maintains the distributor 16 in a retarded position during engine idling to cause ignition by firing spark plug 23 in cylinder 24 at approximately 5° to 15° of rotation of the power take-off driven shaft or crankshaft 25 after the piston 30 has passed its top center position within cylinder 24. Duct 26 connects chamber 19 with the interior of induction conduit 11 at a location adjacent the high pressure side of throttle valve 13 when the latter is at its closed or idle position, thereby to reduce the pressure in chamber 19 and move diaphragm 20 leftward to advance the distributor timing against the biasing force of spring 22 during the initial opening of throttle valve 13 from the idle position shown. In this regard, the opening of duct 26 into conduit 11 may comprise the conventional distributor vacuum advance port.

With the ignition retarded 5° to 15° by spring 22 during idle, the carburetor is adjusted to supply idle fuel at the accelerated rate aforesaid, but at an appreciably leaner fuel-air ratio approximating the stoichiometric mixture of about .07 pound of fuel per pound of air. Accordingly, the low pressure downstream of throttle valve 13 will induce a flow of idle fuel into the induction conduit 11 via port 14 amounting to approximately 25% more idle fuel than would otherwise be required for the same engine when idling at optimum economy. Also supplied to induction conduit 11 via port 14 by the conventional idle air bleed system is a limited quantity of combustion supporting air comprising a portion of the above-mentioned unheated bypass flow when valve 13 is at the idle positon. The air bleed system in its simplest concept comprises a restricted duct 14a which conducts atmospheric air from an upper portion of conduit 11 to the idle fuel supply duct 14b, thereby to disperse the incoming liquid idle fuel and to prevent the siphoning of fuel through the idle fuel port 14 when the engine is not operating.

In addition the bypass flow comprises a certain amount of unheated combustion supporting inlet air which necessarily flows by leakage around the edge of valve 13 at the idle position. For the sake of economy, the tolerances of the induction conduit 11 and the assembly of the throttle valve 13 and its pivot support 27 are relaxed to permit not more than a predetermined quantity of total leakage flow. A final adjustment of the throttle valve 13 at its idle position by means of the customary idle adjustment screw assures a predetermined total quantity of bypass flow, including the above mentioned idle air bled into the idle fuel through duct 14a and supplied via port 14. The total quantity of bypass flow, which is preferably maintained at a minimum consistent with economy in the manufacture of the carburetor parts and which heretofore amounted to approximately 60% of the weight of the total idle inlet air, will remain unchanged in accordance with the present invention but will not amount to approximately 40% of the total idle inlet air by reason of the approximately 54% additional inlet air required to maintain the stoichiometric fuel-air mixture with the accelerated idle fuel flow.

The driven shaft or crankshaft 25 is conventionally mounted within crankcase 28 and is connected by connecting rods 29 with the pistons 30 which reciprocate in the cylinders 24. In the drawing, the engine intake and exhaust valves 31 and 32 for one of the pistons 30 are shown somewhat schematically associated with an inlet header 33, which conducts the fuel-air mixture from conduit 11 to the combustion chamber at the upper end of cylinder 24, and exhaust header 34. A conventional exhaust cross-over passage 35 connects the banks of cylinders 24 at opposite sides of the engine 9 to serve a pressure balancing passage and also to conduct hot exhaust gases into communicaton with the usual carburetor hot spot 36 which preheats the incoming inlet fuel-air mixture to enhance the evaporation of the raw fuel and its admixture with the inlet air, particularly during idling.

A recycling duct 37 connects the crankcase 28 with the induction conduit 11 at a low pressure region downstream of throttle valve 13 so as to recycle piston blow-by products into the combustion chamber. Duct 37 contains a conventional crankcase ventilation safety valve 38 designed to close in the event of a backfire in conduit 11. The valve 38 in its simplest concept comprises a closure plate 39 at the base of an integral guide plunger 40 and yieldingly urged downwardly to a closed position by spring 41. The plate 39 moves vertically within an enlargement of the duct 37 and is adapted to open the latter against the force of spring 41 during crankcase ventilation induced by the low pressure in conduit 11 when the engine 9 is operating.

Preferably the duct 37 is restricted so that the quantity of crankcase vapors conducted into conduit 11 will be no greater than required to remove the gaseous piston blow-by products effectively. In order to prevent a low crankcase pressure that would necessitate sealing of the usual crankcase bearings to prevent an inflow of dirt and a loss of lubrication, the crankcase 28 is maintained at atmospheric pressure by means of a vent duct 42 which extends through a low resistance filter 43 and is supported by the housing 44 for the primary annular air filter 45 at the inlet of induction conduit 11. Preferably the vent 42 opens to atmosphere externally of the filter 45 because of the pressure drop that normally exists across the latter during ordinary engine operation, particularly under load, which would result in sub-atmospheric pressure in crankcase 28.

In accordance with the present invention, the total quantity of inlet air supplied by crankcase ventilation will remain the same as required heretofore, as for example during conventional idling at the condition of optimum fuel economy. Such inlet air supplied by crankcase ventilation, which is not included in the bypass flow described above, amounted heretofore to between approximately 25% to 35% of the total inlet air. Again by virtue of the additional idle inlet air required for the stoichiometric fuel-air mixture with the accelerated idle fuel supply, the above proportions will reduce respectively to approximately 15% to 25% by weight.

It will be appreciated that if the crankshaft bearings are properly sealed, so that the vent duct 42 can be eliminated and the total quantity of air required to recirculate the blow-by vapors substantially reduced, or if the closed crankcase ventilation is not employed, as in the case of certain types of engines discussed above that are not amenable to the recycling of unburned blow-by products from the combustion chamber, the air preheated during engine idling as explained below can be increased correspondingly. It is accordingly apparent that the total quantity of preheated air provided as described herein is the minimum that may be obtained in accordance with the potential of the present invention.

The additional air required to obtain the stoichiometric fuel-air ratio, which amounts to approximately the total quantity of bypass flow as aforesaid, is preheated and added to the induction conduit 11 downstream of throttle valve 13 via a restricted duct 46. In a specific instance, wherein the engine would normally idle at optimum fuel economy with the customary advanced ignition and without the accelerated fuel supply, and wherein the aforesaid bypass flow amounts to approximately 60% by weight of the total inlet air and the crankcase ventilation air amounts to between approximately 25% and 35% by weight of the total inlet air, the heated air added via duct 46 will amount to between approximately 115% and 98% respectively by weight of the total bypass flow of inlet air when the total idle inlet air is increased approximately 54% as described herein.

The duct 46 opens within the confines of the annular filter 45 to receive filtered atmospheric air and terminates in a nozzle or jet 47 directed upwardly against the blade of throttle valve 13 to heat the latter and to facilitate admixing and vaporizing of the idle fuel supplied through port 14. In the embodiment shown, the duct 46 bifurcates near its downstream end so as to discharge into conduit 11 at port 48, as well as through jet 47, downstream of the throttle valve 13. The discharge angles of jet 47 and port 48 are determined as required for optimum mixing of the idle fuel with the idle air supply. Either jet 47 or port 48 may be eliminated in accordance with the requirements for throttle de-icing and idle fuel vaporizing.

Heating of the inlet air supplied through duct 46 is accomplished by heat exchange fins 49 on a portion of the duct 46 within the exhaust gas cross-over 35 whereby the direct heat of the hot exhaust gas is employed for preheating. Thus the preheating will be effective almost immediately after the engine is started and will not be dependent on the temperature of the engine block or the customary engine coolant fluid which frequently requires several minutes of idle operation or several miles of driving before warming to the normal operating temperature. Also the portion of the duct 46 downstream of the fins 49 may be insulated as at 50.

The direct heating of the inlet air by the hot exhaust gases during engine idling is rendered feasible in accordance with the present invention because during engine operation under load or open throttle conditions when preheating of the inlet air is no longer desirable and is in fact often objectionable where combustion chamber overheating is a problem, the pressure differential between opposite ends of the duct 46 will be comparatively small. Consequently, the flow of preheated air will be small and in fact may be inconsequential relative to the greatly increased inlet air flow through conduit 11 when throttle 13 is open.

During engine idling, the pressure at the upper end of duct 46 will be substantially atmospheric because of the comparatively low velocity of air flow through the filter 45. On the other hand, the portion of the conduit 11 downstream of throttle valve 13 will be at a minimum so that the pressure differential between opposite ends of duct 46 will be a maximum. The resistance of duct 46 to air flow is thus determined so that the desired quantity of preheated air described above will be supplied through duct 46 when this maximum pressure differential exists.

We claim:

1. In an internal combustion engine having an acceptable idle operating condition at optimum fuel economy and a crankshaft rotatable within a crankcase through a position corresponding to minimum combustion chamber volume during a fuel-air compression cycle, the combination of
    (A) an electrical ignition system operable during engine idling to fire after rotation of said shaft beyond said minimum volume position,
    (B) an induction conduit having an air inlet opening to atmosphere,
    (C) an operable throttle valve in said induction conduit movable between idle and load positions,
    (D) fuel charging means for supplying idle operating fuel at an accelerated rate with respect to said condition at optimum fuel economy,
    (E) vent means connecting said crankcase with the atmosphere,
    (F) means for supplying idle combustion supporting air to said engine at an accelerated rate with respect to said condition at optimum fuel economy sufficient to effect in cooperation with said idle operating fuel a lean fuel and air mixture containing sufficient air to support substantially complete combustion of said fuel during idle operation comprising
        (1) means for supplying a first predetermined quantity of inlet air including
            (a) means for bypassing a portion of said first quantity around said throttle valve at the idle position, and
            (b) means for supplying another portion of said first quantity into said idle operating fuel at a location upstream of said induction conduit and for dispersing said fuel into said induction conduit, and
        (2) means for supplying a quantity of preheated inlet air amounting to approximately said first quantity or more and heated with respect to the latter including restricted air inlet duct means
            (a) in communication with the atmosphere, and
            (b) passing in heat exchange relationship with the exhaust from said engine, and
            (c) opening into said induction conduit downstream of said throttle valve at the idle position, and
        (3) recycling duct means for conducting gases including blow-by gases from said crankcase to said induction conduit at a location downstream of said throttle valve at the idle position, and
        (4) said vent means and recycling duct means having a combined restriction sufficient to limit the flow of gases from said crankcase into said induction conduit to not more than approximately one-fourth by weight of said idle combustion supporting air.

2. In the combination according to claim 1, a filter in said air inlet for filtering inlet air prior to flowing into said induction conduit, said vent means comprising a restricted duct having low resistance means for filtering gases flowing therethrough and connecting said crankcase with said air inlet at a location between the filter for said air inlet and the opening of the latter to atmosphere.

3. In the method of idling an internal combustion engine for an automotive vehicle having an acceptable idle operating condition at optimum fuel economy, a driven shaft rotatable within a crankcase through a position corresponding to minimum combustion chamber volume during a fuel-air compression cycle, an electrical ignition system adjustable for advancing or retarding its firing with respect to said minimum volume position, a throttle valve movable between idle and load positions within an induction conduit, the steps of
    (A) retarding said ignition system during said idle operation to fire after rotation of said driven shaft beyond said minimum volume position, and simultaneously supplying
    (B) idle operating fuel to said induction conduit at an accelerated rate with respect to said optimum fuel economy, and
    (C) a total quantity of idle combustion supporting air to said induction conduit sufficient to effect a lean fuel and air mixture containing sufficient air to support substantially complete combustion of said fuel during said idle operation by the steps comprising
        (1) supplying a predetermined quantity of idle inlet air around said throttle valve at the idle position and into said induction conduit by the process comprising bleeding a predetermined portion of the last named predetermined quantity of air into said idle operating fuel upstream of said induction conduit and discharging the same with the air bled thereto into said induction conduit at a location downstream of said throttle valve, and
        (2) heating a second quantity of idle inlet air, amounting to approximately said last named predetermined quantity of air or more, by conducting said second quantity in heat exchange relationship with the hot exhaust duct of said engine and discharging the heated second quantity of air into said induction conduit downstream of said throttle valve at the idle position, and
        (3) venting air into said cranckcase and conducting a retsricted flow of gases, comprising the latter air vented into said crankcase and blow-by gases therein and amounting to not more than approximately one-fourth by weight of said total quantity of idle combustion supporting air, from said crankcase into said induction conduit downstream of said throttle valve at said idle position.

4. In an engine according to claim 1, said ignition system including means for retarding its firing until approximately 5° to 15° of driven shaft rotation beyond said minimum volume position.

5. In an engine according to claim 1, said means for supplying said idle combustion supporting air comprising means for effecting a total combustion supporting inlet air supply for said lean mixture amounting to approximately 50% more than the air required at said optimum fuel economy.

6. In an engine according to claim 5, said air inlet duct means having terminal jet means for directing at least a portion of the preheated inlet air against said throttle valve to heat the latter.

7. In the method according to claim 3, said step of retarding said ignition system comprising the retarding of said ignition system to fire at between approximately 5° to 15° of rotation of said driven shaft beyond said minimum volume position.

8. In the method according to claim 3, said step of supplying said total quantity of idle combustion supporting air to said induction conduit comprising the supplying of approximately 50% more than the air required for said optimum fuel economy.

References Cited

UNITED STATES PATENTS

| | | |
|---|---|---|
| 2,655,141 | 10/1953 | Hayden. |
| 2,846,989 | 8/1958 | Eskew. |
| 3,151,604 | 10/1964 | Walker et al. |
| 3,162,184 | 12/1964 | Walker _____ 123—117.1 |
| 3,181,833 | 5/1965 | Adams et al. |
| 3,356,083 | 12/1967 | Clark et al. _____ 123—117.1 |

WENDELL E. BURNS, Primary Examiner

U.S. Cl. X.R.

123—97, 122